United States Patent [19]

Nussbaumer et al.

[11] Patent Number: 4,513,504

[45] Date of Patent: Apr. 30, 1985

[54] METHOD FOR DETERMINING THE POSITION OF A PRESSED-AHEAD HOLLOW-SECTION LINE, AND APPARATUS FOR IMPLEMENTING THE METHOD

[75] Inventors: Manfred Nussbaumer, Leonberg; Eberhard Beitinger, Stuttgart; Wolfgang Möhlenbrink, Esslingen, all of Fed. Rep. of Germany

[73] Assignee: Ed. Züblin Aktiengesellschaft, Stuttgart, Fed. Rep. of Germany

[21] Appl. No.: 380,082

[22] Filed: May 20, 1982

[30] Foreign Application Priority Data

May 20, 1981 [DE] Fed. Rep. of Germany ....... 3120010

[51] Int. Cl.³ ............................................. G01B 11/27
[52] U.S. Cl. ........................................ 33/1 H; 299/1; 356/153; 175/45
[58] Field of Search ............... 299/1; 175/45; 33/1 R, 33/1 H, 300, 301, 304, 312, 313, 315; 405/143; 356/138, 153; 364/559

[56] References Cited

U.S. PATENT DOCUMENTS 3,321,248  5/1967  Williamson et al. ............... 299/1
3,484,136  12/1969  Colson ................................. 299/1
4,392,744  6/1983  Tatsuhama et al. ............... 299/1 X

OTHER PUBLICATIONS

Hamamatsu—C1373 Position Sensor System, Cat. #TV-045-01, 5/30/80.

Primary Examiner—Harry N. Haroian
Attorney, Agent, or Firm—Becker & Becker, Inc.

[57] ABSTRACT

A method and apparatus for determining the position of a pressed-ahead hollow-section line, especially with any desired three dimensional curvature, and having measuring points permanently and securely arranged in the hollow-section line. The three dimensional position of the measuring points, e.g. signal emitters, is detected by automatic sensing devices e.g. cameras, having remote control or long-distance transmission, and being arranged in the hollow-section line.

3 Claims, 6 Drawing Figures

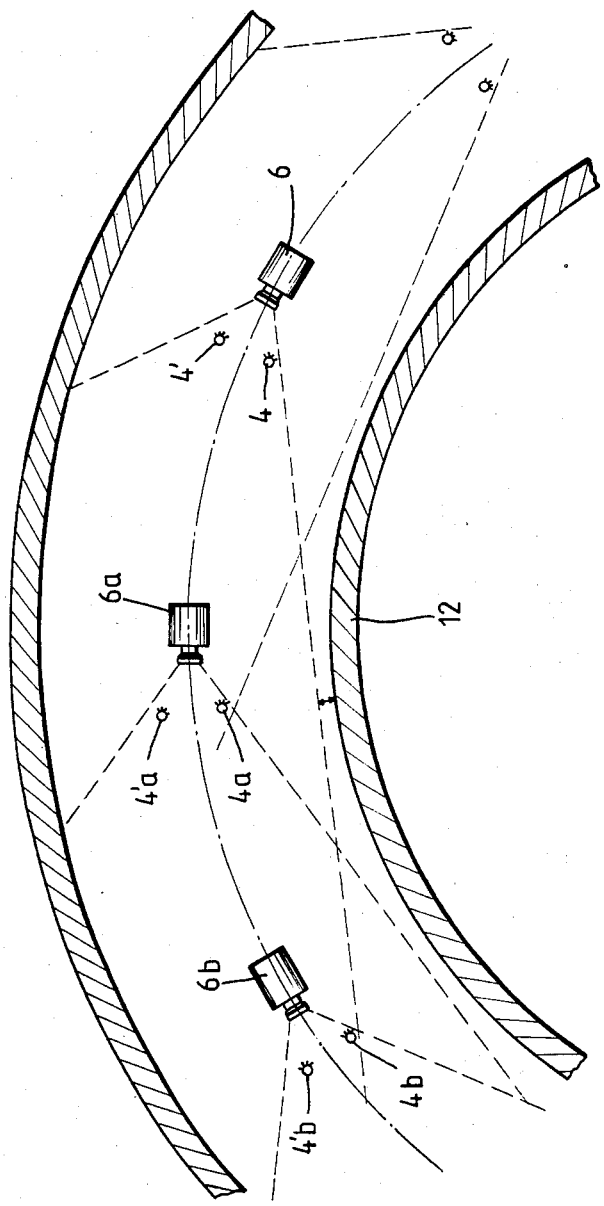
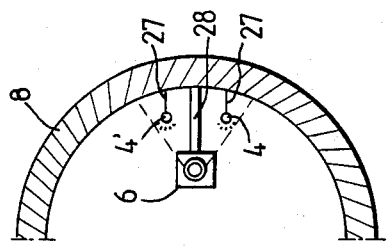

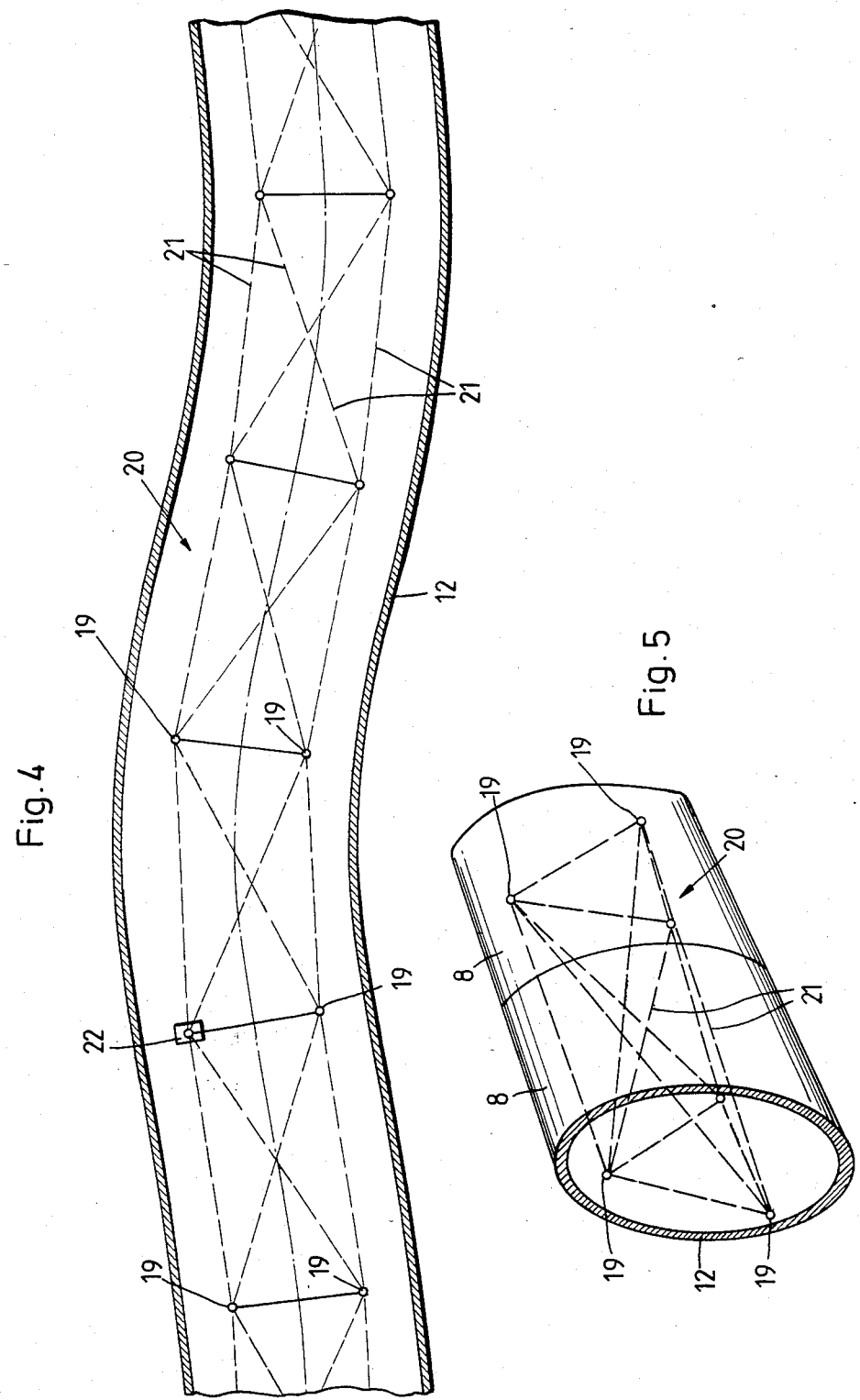

METHOD FOR DETERMINING THE POSITION OF A PRESSED-AHEAD HOLLOW-SECTION LINE, AND APPARATUS FOR IMPLEMENTING THE METHOD

The present invention relates to an apparatus and method for determining the position of a pressed-ahead hollow-section line, particularly with any desired three dimensional curvature, and having measuring points arranged permanently in the hollow-section line.

The pressing-ahead of assembled hollow-section lines such as pipes, tubes, or tunnels increasingly gains importance in conventional and mechanical underground working or mining. When referring to a pressing-ahead, what is meant is a method with which, generally from a shaft, a hollow-section line of any desired cross section and composed of several identical structural parts is pressed into the ground, whereby simultaneously the ground entering the interior of the hollow section is broken up and is removed or withdrawn through the hollow-section line. A controllable element, for instance a cutter jaw, is arranged at the front end of the hollow-section line; the cutter jaw facilitates the penetration into the ground, and the excavation occurs with the confines thereof. The ground present at the work face is broken up and transported away either manually or mechanically.

The entire line, with the main presses installed in the pressing shift, is pressed ahead by the length of one structural part. The extension of the hollow-section line occurs cyclically in the pressing shaft by adding a new structural part after retraction of the pressing means. Installation and pressing-head of the entire hollow-section line accordingly occur from one location.

The cutter jaw carries at least three control presses for control of direction, whereby the hollow-section line reacts more or less quickly to undertaken control measures depending upon the ground conditions.

Continuous control of maintaining the line and the gradient is necessary for accurate guidance or control. With conventional methods, level measurement and position measurement must repeatedly be supplied anew from the shaft. The measuring path becomes continuously longer, so that these methods are very expensive. Additionally, the feed must stop during the time of measurement, and there exists, however, the danger that with control corrections after a measurement, the introduced or applied control pressures may effect an overcontrol to the other side of the intended curve, which makes necessary renewed corrections and can lead to an increasing overcontrol in both directions. An accurate control consequently consists of timely recognition of deviations, which must then be compensated for, dependent upon the skill and experience of the operator.

Light beam systems have become known for accurate guidance of the cutter jaw; with these, for the most part concentrated light beams are made visible on an indicator panel, provided with crossed lines, on the cutter jaw. The operator can then control the cutter jaw dependent upon the deviations on the indicator panel. The feed or advance with these systems, however, must repeatedly be interrupted in order to again concentrate and position the guide-beam transmitter on the cutter jaw. This displacement or shifting occurs especially frequently when the feed or advance path has a bend or curvature, since the guide-beam transmitter only operates in a straight line. Utilization of the guide-beam transmitter is consequently possible with justifiable cost only with slightly curved gradients. The adjustment and new positioning frequently still necessary herewith is very time consuming, so that the feed or advance speed is very small since the feed or advance must stop during the measurement.

Pulses which are plotted over days are emitted by a transmitter installed in a cutter jaw in a known method for determining the position of the cutter jaw. The position of the cutter jaw is then ascertained according to classic geodetic methods. This method, however, can be used with suffficient accuracy only with limitations below cultivated or built-up land, or below water level. Additionally, this method only provides information about the position of the cutter jaw, and neglects a lateral deviation of the hollow-section line, which considerably affects the direction of the cutter jaw.

The use of a gyrocompass which is coupled with a course recorder is already utilized for bridging the times between the necessary geodetic point and direction determinations in the hollow-section line. Drifting of the gyroscope falsifies the measurement results however, so that a conventional geodetic point and direction determination remains absolutely necessary. Since the gyrocompass dependent on system only detects the azimuth alignment of the cutter jaw, no height or level information is available about the cutter jaw.

It is an object of the present invention to provide a method, at desired frequency and briefly, for sequential determination of three dimensional positions of a hollow-section line during pressing ahead without hindering or interrupting the pressing procedure. It is another object of the present invention to provide an apparatus for carrying out such a method.

These and other objects and advantages of the present invention will appear more clearly from the following specification in connection with the accompanying drawings, in which:

FIG. 2 is a plan view of a sectioned hollow-section strand according to FIG. 1;

FIG. 2A is a fragmentary cross section of the strand of FIG. 2;

FIG. 4 is a section through a hollow-section strand with measuring points of a three-dimensional line network; and FIG. 5 is a perspective view of a hollow-section strand according to FIG. 4.

Figure 1:
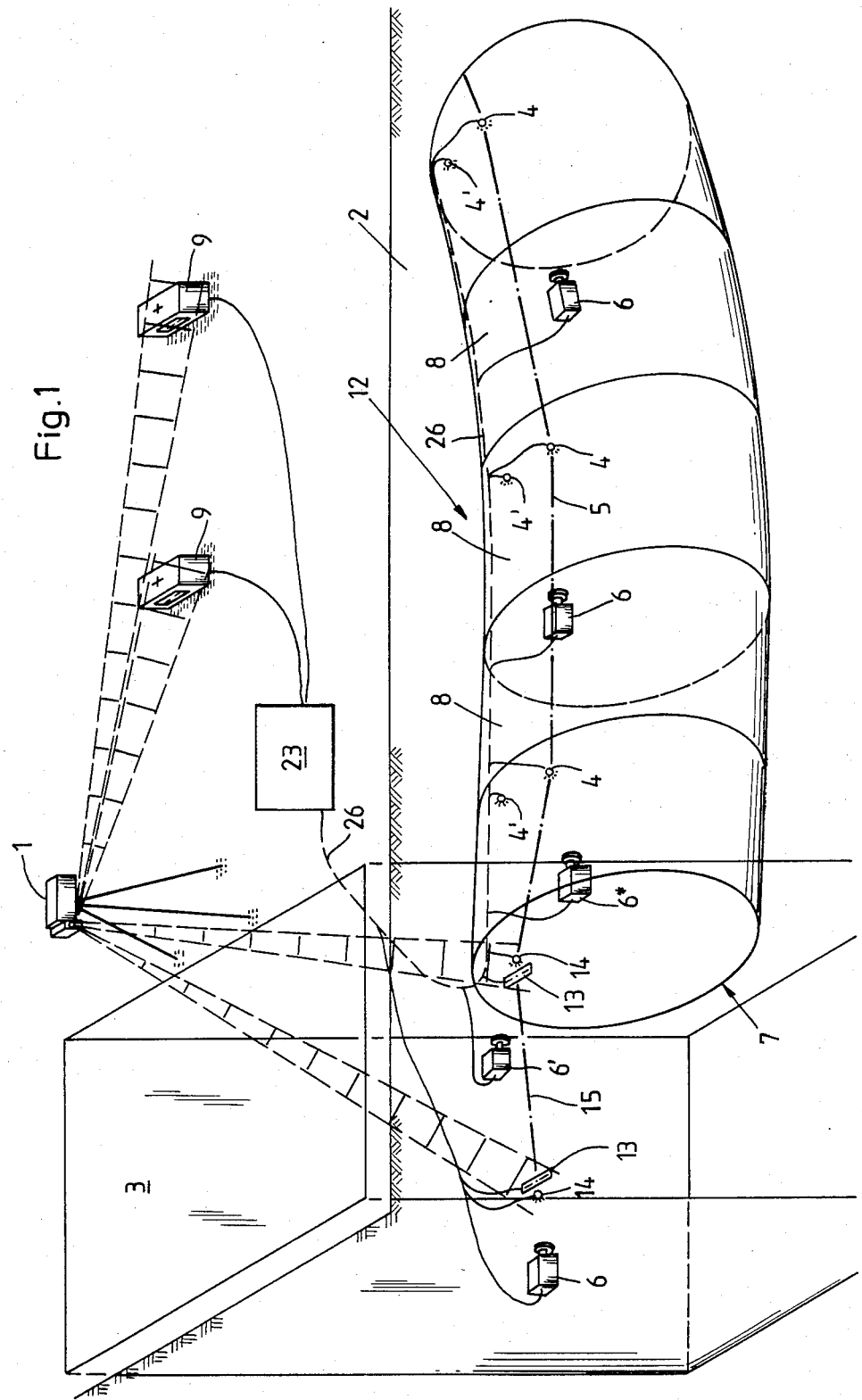
FIG. 1 is a schematic illustration of a construction site for pressing ahead a hollow-section strand or line having a measuring device according to one embodiment of the present invention.

The method of the present invention may be characterized in that the three dimensional position of the measuring points is detected by automatic sensing devices, having remote control or long-range transmission, and arranged in the hollow-section line.

Measurement data necessary for calculating and determining position can be recalled at any point in time without interrupting the pressing procedure via the method in accordance with the present invention, so that the position of the hollow-section line is controllable at any time. Accordingly, tendencies for possible changes of direction can be detected, so that a direction correction can be carried out early. The feeding or advancing speed can be increased considerably with higher directional accuracy compared with the state of the art, since no pauses or interruptions result anymore for taking measurements. The method according to the present invention makes it possible to join together in a surprisingly simple manner requirements which in themselves are contradictory, namely an increased feed or advancing speed with increased accuracy.

One straightforward apparatus for carrying out the method of the present invention is characterized in that mechanical axes are formed by wire or similar components between the measuring points, which are adjacent in the longitudinal direction, and in that at the intersections of these axes, there are arranged angle measuring means which detect the horizontal and vertical angles of refraction. These angles of refraction are fed to a measurement detection location via the remote control so that, because of the existing values, a three dimensional determination of position of the hollow-section line is possible.

A preferred embodiment of an apparatus for carrying out the method of the present invention is characterized by signal emitters, preferably infrared diodes or laser diodes, as measuring points, and by position sensors, preferably cameras, permanently arranged in the hollow-section line and sequentially spaced from one another in the longitudinal direction; these position sensors respectively detect at least three measuring points sequentially arranged in the longitudinal direction. The signal emitters have a radiation of a certain wavelength (spectrum), which are received and registered by likewise permanently built-in position sensors. The signals applied at the outputs of the position sensors can then be utilized for calculating the three dimensional position of the hollow-section line. The accuracy of the position can be increased considerably if the allocated connection points are monitored for three dimensional displacement.

Both horizontally as well as vertically ascertainable measuring points may be provided as connection points on a three dimensional coordinate system superimposed at the start of the hollow-section line, with linear position sensors preferably being arranged at the connection points.

A vertical plane is advantageously provided for detecting a three dimensional displacement of the connection points; this is preferably effected via a rotating vertical laser.

Position sensors may be arranged at above-ground measuring points for determining three dimensional changes of position of the rotating vertical laser.

At least one further measuring point may, for determining the roll movement, be associated with each existing measuring point in the transverse direction to the hollow-section line, whereby the measuring points in the transverse direction of the hollow-sectioned line are preferably securely connected with each other by a shaft of preferably known length, with a clinometer or inclination-measuring means having remote control or long-range transmission capability preferably being arranged on the shaft. The measuring points may be arranged on a rail and may be transversely shiftable relative to the hollow-section line.

The distance between the connection points and the next positioned measuring point connected with the hollow-section line may be detectable by a preferably electronic detector.

At least three signal emitters, which can be detected by one of the position sensors, may be arranged on the cutter jaw.

The signal emitters and the position sensors may be separately controllable via remote control, whereby preferably each three signal emitters and a position sensor associated therewith are cyclically controllable by an automatic control device, preferably a process computer.

The method of the present invention may also be characterized in that the measuring points are arranged in such a way that they make possible the formation of a three dimensional line network, the lines of which are ascertained or determined by permanently and securely installed automatic distance-determining devices having remote or long-range transmission.

The lines of the three dimensionally defined line networks are detected by the distance detecting devices, and from this the three dimensional position of the hollow-section line can be determined.

In accordance with an advantageous further development of the present invention, the detected measured values are fed to a computer, which ascertains deviation from the intended position via appropriate algorithms. During the pressing-ahead of the hollow-section strand, position measurements can be carried out as frequently and whenever desired over the entire length of the line, so that an extensively continuous control of the spatial or three dimensional position of the hollow-section line and, hence, a continuous direction or alignment correction of the cutter jaw, is possible. The position and direction accuracy of the pressing-ahead can be considerably increased in this manner.

Information about position and direction may be made accessible at any time to an operator of the control presses via a suitable medium, preferably a viewing screen.

The entire measuring procedure may be controlled by a process computer which determines and evaluates the measured data.

Referring now to the drawings in detail, FIG. 1 shows a hollow-section strand, line, or excavation 12, which starts from a pressing shaft or tunnel 3 and comprises several structural parts 8, being pressed or driven ahead into the ground 2 in a known manner via a forward-pressing device not illustrated in greater detail. Infrared diodes 4, 4' are, for example, arranged as measuring points in the hollow-section line 12; the infrared diodes 4 are arranged sequentially in the longitudinal direction at fixed distances from one another. Cameras 6 are stationarily arranged as position or location sensors in the hollow-section line 12 and are spaced from each other in the longitudinal direction; the position of the cameras is such that the cameras can always receive the radiation from three infrared diodes 4, 4a, 4b (FIG. 2) located sequentially in the longitudinal direction. Attention must be given to providing a sufficient range of effectiveness (refraction) of the position sensors, i.e. the cameras 6, 6a, 6b, from the inner boundaries of the hollow-section line 12.

The cameras 6, 6a, 6b, and infrared diodes 4, 4', 4'a, 4'b, 4a, 4b, which are expediently stationarily installed in the apex of the pressed-ahead, hollow-section line 12, are advanced in the pressing direction along with the hollow-section line 12. The distances 5 between the individual cameras 6, 6a, 6b, as well as the distances between the individual infrared diodes 4, 4a, 4b, are ascertained at the beginning of the pressing ahead with a tape measure or similar means, and are permanently introduced into a process computer 23. This data is fixed data during the entire pressing ahead.

Naturally, it is also possible to undertake the individual measurements between the cameras 6 and the infrared diodes 4 via automatic distance-measuring means, whereby such automatic distance-measuring means can also be installed stationarily, and can measure the distances anew before each determination of three-dimensional position of the hollow-section line 12, in order to detect possible length changes of the hollow-section line 12. The accuracy of the determination of position can thus be further increased.

The starting distance between connection points and the first measuring point (infrared diode 4) is expediently detected by an electronic scanner or measuring device. A stationarily arranged ultrasonic transmitter is especially suitable for this purpose, and determines the starting distance up to the measuring point in the hollow-section line 12, and preferably feeds this distance via a long-range transmission device or remote control directly to the process computor 23.

The signals of the infrared diodes 4, 4a, 4b are fed from the cameras 6, 6a, 6b, via a preferably integrated measured value converter or transducer, as image coordinates via a transmission line 26 to the computer 23 which, together with the known distances between the infrared diodes in the longitudinal direction, determines the three-dimensional angles of refraction between the axes determined by the measuring points. Accordingly, the position and direction of the hollow-section line 12 can be determined in very short time intervals with the known relative position of the measuring points relative to the hollow-section cross section, whereby simultaneously the pressing ahead can be controlled via an appropriate algorithm in order to bring about the necessary directional corrections.

Further infrared diodes 4', 4'a, 4'b are associated with the infrared diodes 4, 4a, 4b (FIG. 2) in the transverse direction of the hollow-section line 12 for determining roll movements about the longitudinal axis of the hollow-section line 12, so that one pair of infrared diodes 4, 4'; 4a, 4'a; 4b, 4'b is always associated therewith, and the roll component can be determined simultaneously with each measurement.

Figure 3:
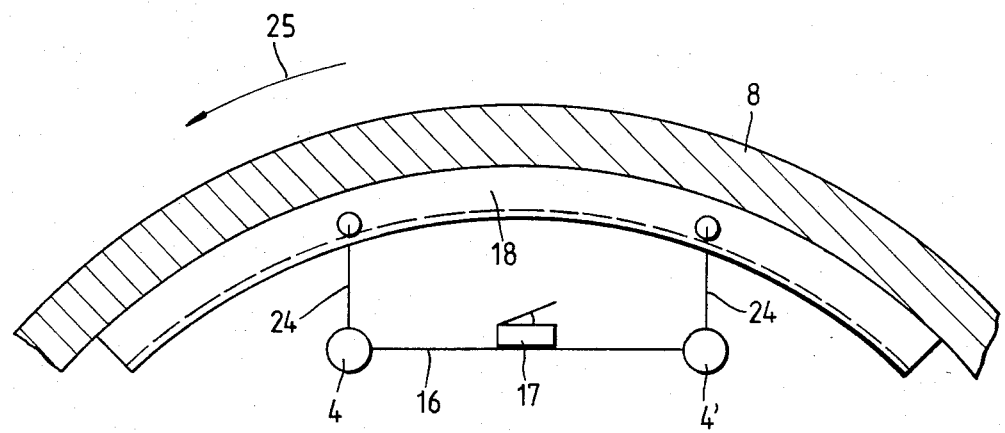
FIG. 3 shows an apparatus for arranging measuring points in the hollow-section strand.

FIG. 3 shows an advantageous embodiment of a measuring point arrangement for ascertaining the roll component. Both measuring points (infrared diodes) 4, 4' are arranged by suspensions 24 in the structural part 8 of the hollow-section line 12, and are connected with each other by a rigid shaft 16. A preferably electronic clinometer 17 is arranged on the rigid shaft 16; the output signal of the clinometer 17 is likewise fed to the process computer 23. If the structural part 8 rolls in the direction of arrow 25, this is detected by a clinometer or inclination measuring means 17, and is transmitted to the process computer 23, which takes this detected measured value into account when determining the position. Likewise, the spacing of the two measuring points (infrared diodes) 4, 4' rigidly defined by the shaft 16 can be given to the process computer 23 as fixed magnitudes; the process computer 23 can utilize these values in an advantageous manner in the calculation of the position.

To compensate for significant roll movements, the suspension 24 is arranged transversely shiftable in a rail 18, which is expediently fixed to the inner side of the structural part 8, and is adapted to the radius of curvature thereof. Naturally, straight rails, arranged horizontally for example, can also be used.

For fixing the height, and for transverse stabilization of the measuring system, a pair of electronic levels, clinometers, or levels is installed in the longitudinal or transverse directions, at least in the first camera 6*. For stabilization purposes, it is further recommended, after longer sections, for instance 500 meters, to also provide further levels, possibly even directional gyroscopes, since a higher accuracy can be attained hereby. Connection points 14, which likewise are signal emitters, are provided in the pressing shaft 3 for connection to a reference or fixed point network. The coordinates of the connection points 14 are measured by known devices, so that their position is known. The camera 6 provided in the pressing shaft 3 on the wall opposite to the starting location 7 of the hollow-sectioned line 12 detects both connection points 14 and a first measuring point (infrared diode) 4 stationarily arranged in the hollow-sectioned line 12. The position of the first measuring point 4 of the hollow-sectioned line 12 can be determined from the measured values transmitted by means of the long-distance transmission or remote control to the process computer 23. A second camera 6' arranged ahead of the first camera 6 in the longitudinal direction of the hollow-sectioned line 12 now detects one connection point 14, the measuring point 4 with its image coordinates transmitted in the previous measuring cycle, and a third measuring point 4, the three-dimensional position of which is to be ascertained. As shown in FIG. 2, the camera 6 thus always detects three measuring points (infrared diodes) 4, 4a, 4b, with the coordinates of two points always being known. A position determination can be carried out in this manner along the entire hollow-sectioned line 12.

The infrared diodes and the cameras are advantageously conected via respective feed lines with a transmission line 26 leading to the process computer 23, by means of which the measured data is transferred, and a control of the individual elements is made possible. Accordingly, in one measuring cycle, for instance the camera 6 (FIG. 2) and the infrared diodes 4, 4a, and 4b to be detected are excited, while none of the other elements are activated. Naturally, when the infrared diodes 4,4' are arranged in pairs for ascertaining a roll component, the individual diode pairs 4, 4'; 4a, 4'a; 4b, 4'b are excited in common.

The position of the entire hollow-section line 12 is detected by the process computer in this manner.

Wiring the position sensors (cameras) as well as the signal emitters (infrared diodes) is only one of several possible configurations. A wireless transmission or excitation, is, of course, also possible.

Likewise, it is advantageously to have the infrared diodes 4 associated with the camera 6 designed for a particular radiation (spectrum) which can only be received by the camera associated therewith. The image-point information is thus applied constantly at the output of the position sensor, and only when required is it recalled by the process computer 23 or another similar control device.

A coordinate-and-direction-connection is expediently provided via the pressing shaft 3 to the reference point network on the ground surface since the connection points 14 in the pressing shaft 3 cannot be considered as stationary. Under the effect of the pressing pressure, the shaft walls can sometimes be permanently deformed;

likewise, the bottom of the shaft can change its position relative to the reference point network.

The connection points 14 are arranged in such a way that they are visible on the one hand from the edge of the shaft, and on the other hand are visible from the connection direction of the hollow-body line. Linear position sensors 13 are connected to the infrared diodes of the connection points 14 in such a way that they can be detected from the shaft edge by a vertical laser 1. The connection direction is thus connected to the fixed or reference points on the ground surface.

Position sensors 9 are likewise installed at two aboveground fixed or reference points, so that three-dimensional movements of the laser 1 can be detected by the process computer 23 and can be included through connections in the determination of position.

Advantageously, the cutter jaw is included in the determination of position; for this purpose, signal emitters are arranged on the cutter jaw, and are detectable by one of the position sensors. Three signal emitters are provided, at least two of which must be spaced from each other in the longitudinal direction.

A further method in accordance with the present invention is provided thereby that according to FIGS. 4 and 5, the measuring points 19 arranged in the hollow-sectioned line 12 are arranged in such a way that they make possible the formation of a three-dimensionally defined line network 20. For this purpose, three spaced-apart measuring points 19 are arranged in each structural part 8; the connection lines of the measuring points 19 with respect to directly adjoining measuring points are advantageously ascertained as lines 21 of the three-dimensional line network 20 in space by automatic distance-determining devices 22. The distance-determining devices 22 transmit output signals corresponding to the lines or distances 21 to an evaluation device, preferably a process computer (not illustrated), which transmits a three-dimensional position determination of the hollow-section line on the basis of the three-dimensionally defined line network, and calculates control magnitudes in relation to the ideal or precalculated position. In an advantageous embodiment, the distance-determination devices 22 are connected via suitable measured value converters directly with the computer, so that the determination of the three dimensional position of the cutter jaw can be automated.

With the method according to the present invention, it is possible to provide the three dimensional position of the hollow-section line to an operator at a control desk of the cutter jaw at any time. Tendencies of the pressed-ahead hollow-section line to deviate can be recognized early during the pressing ahead because of the plurality of possible measurements, so that countermeasures can be initiated.

In the illustrated embodiment, the structural parts 8 of the hollow-sectioned line 12 are provided alternatively with infrared diodes 4, 4' and cameras 6. The cameras 6, just like the infrared diodes 4, 4', are vertically spaced from the upper apex of the hollow-sectioned line in a fixed arrangement by means of spacers 27, 28 (FIG. 2a).

The present invention is, of course, in no way restricted to the specific disclosure of the specification and drawings, but also encompasses any modifications within the scope of the appended claims.

What we claim is:

1. In a method for determination of position of a pressed-ahead hollow-section line which can provide spatial three-dimensional contortion therewith, the steps comprising:
   in the hollow-section line, providing an arrangement of fixed measuring points with spacing from each other;
   moving the measuring points along in the pressed-ahead direction with the hollow-section line;
   distributing the measuring points over the entire length of the hollow-section line;
   in the longitudinal direction of the hollow-section line, fixedly arranging several automatic sensing-detection devices in series over the entire length thereof and also moving these devices along the hollow-section line in the pressed-ahead direction;
   determining the spatial three-dimensional position of the measuring points relative to each other via the sensing-detection devices;
   in the longitudinal direction of the hollow-section line, measuring the distances of the sensing-detection devices to the respectively next sensing-detection device and the distances of the measuring points to the respectively next measuring point;
   from the output signals of the sensing-detection devices and the measured distances, calculating a closed distance line, extending over the entire length of the hollow-section line and thereby determining the position of the hollow-section line.

2. A method according to claim 1 further including steps therewith whereby at a starting location of the hollow-section line there is providing of measuring points which are the connection points for a prescribed, superposed, spatial three-dimensional fixed point network (coordinate system); and detecting these measuring points via the sensing-detection devices, whereby there is determining of the position of the hollow-section line in the spatial three-dimensional fixed point network.

3. In a method according to claim 1, said method including the steps of:
   arranging said measuring points in such a way as to make possible the formation of a spatial three-dimensional line network; and
   ascertaining the lines of said line network by permanently installed automatic distance-determining devices having remote control.

* * * * *